US008083881B1

(12) United States Patent
Reeves

(10) Patent No.: US 8,083,881 B1
(45) Date of Patent: Dec. 27, 2011

(54) NAME BADGE LABELING SYSTEM

(75) Inventor: Robert J. Reeves, Attleboro, MA (US)

(73) Assignee: Reeves Company, Inc., Attleboro, MA (US)

( * ) Notice: Subject to any disclaimer, the term of this patent is extended or adjusted under 35 U.S.C. 154(b) by 202 days.

(21) Appl. No.: 12/423,833

(22) Filed: Apr. 15, 2009

(51) Int. Cl.

| | |
|---|---|
| ***B44C 1/165*** | (2006.01) |
| ***B29C 65/00*** | (2006.01) |
| ***B31B 1/60*** | (2006.01) |
| ***B32B 37/00*** | (2006.01) |
| ***B65H 37/00*** | (2006.01) |
| ***B65C 9/18*** | (2006.01) |
| ***A44C 3/00*** | (2006.01) |
| ***G01D 21/00*** | (2006.01) |

(52) U.S. Cl. .......... 156/230; 156/60; 156/540; 156/541; 156/542; 40/1.5; 33/613

(58) Field of Classification Search .................. 156/230, 156/60, 540–542; 40/1.5; 33/613

See application file for complete search history.

(56) References Cited

U.S. PATENT DOCUMENTS

| | | | | |
|---|---|---|---|---|
| 0,584,770 | A | 6/1897 | Datz | |
| 3,057,073 | A | 10/1962 | Swartz | |
| 3,939,588 | A | 2/1976 | Hockaday | |
| 4,369,582 | A * | 1/1983 | Pfeffer | 33/613 |
| 5,242,526 | A * | 9/1993 | Adair | 156/475 |
| 5,305,538 | A | 4/1994 | Kanzelberger | |
| 5,398,435 | A * | 3/1995 | Kanzelberger | 40/1.5 |
| 5,410,827 | A | 5/1995 | Smith | |
| 5,680,709 | A | 10/1997 | Stone | |
| 6,173,514 | B1 * | 1/2001 | Peterson | 40/1.5 |
| 6,385,860 | B1 | 5/2002 | MacWilliams et al. | |
| 6,484,424 | B1 | 11/2002 | Peterson | |
| 6,524,412 | B2 | 2/2003 | Smith | |

* cited by examiner

*Primary Examiner* — Khanh P Nguyen
*Assistant Examiner* — Matthew Hoover
(74) *Attorney, Agent, or Firm* — Salter & Michaelson

(57) ABSTRACT

A labeling system for applying an adhesive backed name tape to a name badge. The system includes a base member or fixture having a seat for receiving the name badge and a pair of spacedly disposed bridge members supported by the base member adjacent respective ends of the seat. The adhesive backed name tape is positioned over the name badge, extending between the pair of bridge members and spaced from the name badge. The bridge members preferably have a ribbed upper contact surface. A roller is used for contacting a top surface of the adhesive backed name tape so as to apply the adhesive backed name tape to the name badge.

24 Claims, 11 Drawing Sheets

NAME BADGE LABELING SYSTEM

FIELD OF THE INVENTION

The present invention relates in general to a labeling system and pertains, more particularly, to an improved labeling system for name badges.

BACKGROUND OF THE INVENTION

The usual technique for applying an adhesive-backed name tape to the front surface of a name badge is to visually align the tape over the badge and then press the tape manually against the badge surface. In this regard, reference is made to the prior art view of FIG. 1 which illustrates the user grasping the adhesive backed name tape 12 for positioning over the name badge 10. The problem with this technique is that there is difficulty in obtaining a proper alignment between the tape and the badge surface. With this known technique, it is difficult to provide a proper alignment and a smooth adherence between the tape and the badge. Thus, many times in making this application, air bubbles become trapped between the tape and the badge surface. There is either additional labor involved in eliminating the trapped air bubbles or the name badge has to be redone or discarded. The hand application illustrated in FIG. 1 is both time consuming and tedious.

Accordingly, it is an object of the present invention to provide an improved name badge labeling system that is simpler and quicker in operation.

Another object of the present invention is to provide an improved name badge labeling system that overcomes the problems mentioned above, in particular the formation of air bubbles and misalignment.

SUMMARY OF THE INVENTION

To accomplish the foregoing and other objects, features and advantages of the present invention there is provided a labeling system for applying an adhesive backed name tape to a name badge. The labeling system comprises a base member having a seat for receiving the name badge and positioning the name badge at a fixed location on a top surface of the base member, and a pair of spacedly disposed bridge members supported by said base member adjacent respective ends of the seat. The pair of bridge members each have an upper surface that extends above the top surface of the base member, and the adhesive backed name tape is positionable over the name badge, extending supported between the pair of bridge members and spaced from the name badge. A roller is provided for contacting a top surface of the adhesive backed name tape so as to apply the adhesive backed name tape to the name badge.

In accordance with other aspects of the present invention the seat may be formed by an indentation in a top layer of the base member; the seat is preferably of the same size as the name badge; the base member may have legs for the support thereof; each bridge member preferably has a rectangular cross-section with a length that extends substantially orthogonal to the length of the seat; and each bridge member preferably has a top surface formed with a plurality of spaced ribs wherein the ribs each provide a contact line with the adhesive backed name tape and extend substantially orthogonal to the length of the seat.

In accordance with another embodiment of the present invention there is provided a labeling system for applying an adhesive backed name tape to a name badge. The labeling system comprises a base member having a seat for receiving the name badge and positioning the name badge at a fixed location on a top surface of the base member and means defining a pair of spacedly disposed bridge members fixedly supported by the base member adjacent, but spaced from respective ends of the seat. The pair of bridge members each have an upper surface that extends above the top surface of the base member and the adhesive backed name tape is positionable over the name badge, extending supported between the pair of bridge members and spaced from the name badge. Means are provided for contacting a top surface of the adhesive backed name tape so as to apply the adhesive backed name tape to the name badge.

In accordance with this last embodiment of the present invention the seat may be formed by an indentation in a top layer of the base member; the seat is preferably of the same size as the name badge; the base member may have legs for the support thereof; each bridge member preferably has a rectangular cross-section with a length that extends substantially orthogonal to the length of the seat; and each bridge member preferably has a top surface formed with a plurality of spaced ribs wherein the ribs each provide a contact line with the adhesive backed name tape and extend substantially orthogonal to the length of the seat.

In accordance with the present invention there is also provided method of applying an adhesive backed name tape to a name badge. This method comprises the steps of providing a base that has an indentation in a top surface thereof that forms a seat for receiving and fixedly positioning a name badge therein; locating a bridge member fixedly adjacent each end of the seat with each bridge member extending above the top surface of the base so that any adhesive backed name tape, when placed between the bridge members, is spaced over the name badge; placing the adhesive backed name tape between the bridge members with the adhesive backed name tape in alignment with the name badge; and contacting the adhesive backed name tape on a non-adhesive side thereof with a rolling action to adhere the adhesive backed name tape to the name badge.

In accordance with other aspects of the method of the present invention the seat may be formed by an indentation in a top layer of the base member; including providing legs on the base; including forming ribs on the bridge member that each define a contact line with the adhesive backed name tape; wherein the ribs are disposed spaced from each other and in parallel and wherein the rolling action is performed by a hand roller applied by a user over the top of the adhesive backed name tape.

DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings, in which.

DETAILED DESCRIPTION

Figure 1:
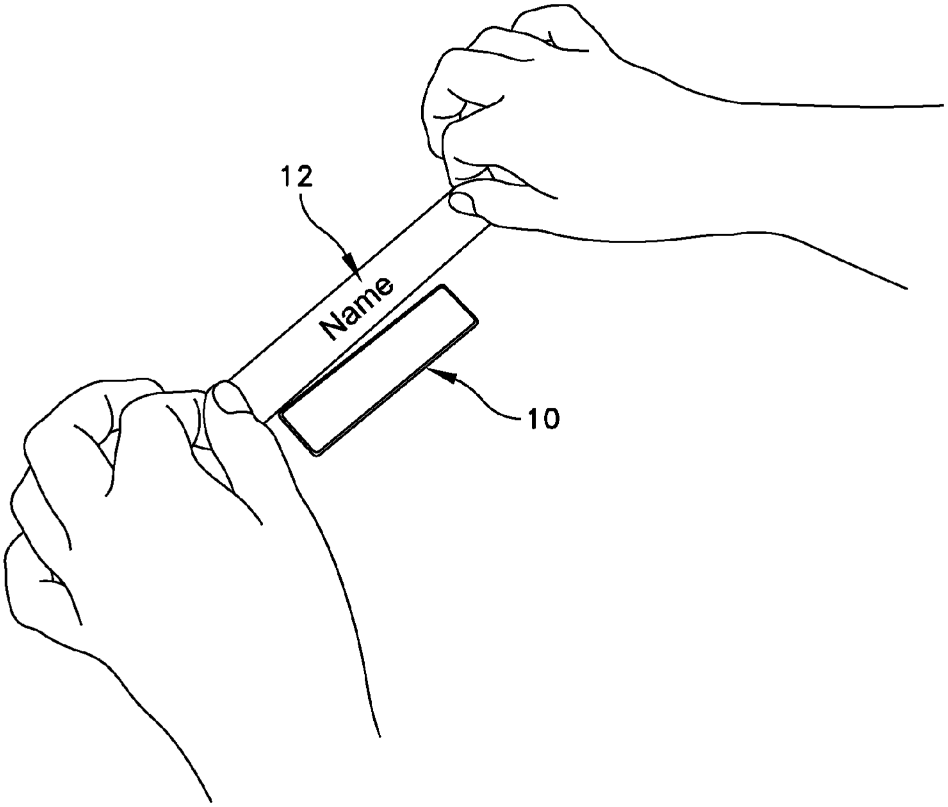
FIG. 1 (PRIOR ART)
FIG. 1 is a prior art illustration of a technique for applying a name tape to a badge.

The labeling system of the present invention is illustrated in the drawings. This system provides an effective and simple means for a name label to be attached to the front face of a name badge. The application device of the present invention provides a superior and rapid system for applying individual name labels to a name badge surface. The label may include black or colored lettering on a clear labeler tape. The device of the present invention enables a more rapid operation of the application of the label to the name badge. Moreover, the system and associated method that is used aids in a perfect alignment between the label and the name badge and eliminates trapped air bubbles between the badge surface and the name tape. This reduces labeling costs caused by having to redo a label or discard a name badge. This eliminates an operator from struggling with the tedious tasks associated with the usual hand application.

Figure 2:
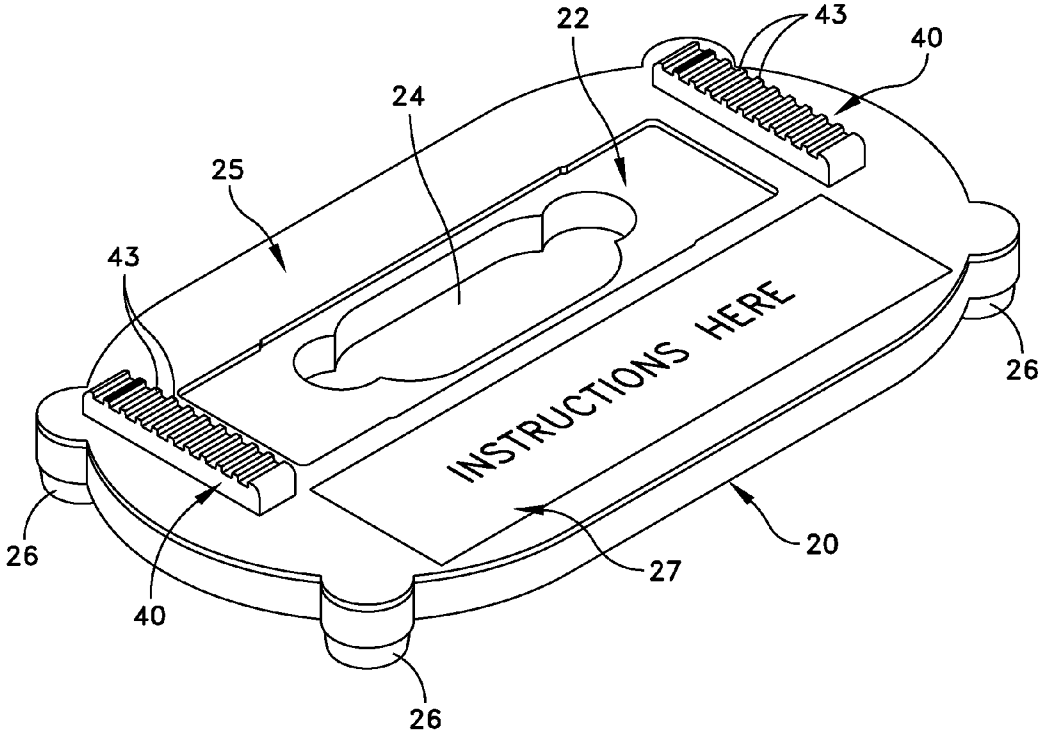
FIG. 2 is a perspective view of a preferred embodiment of the labeling device of the present invention.
Figure 3:
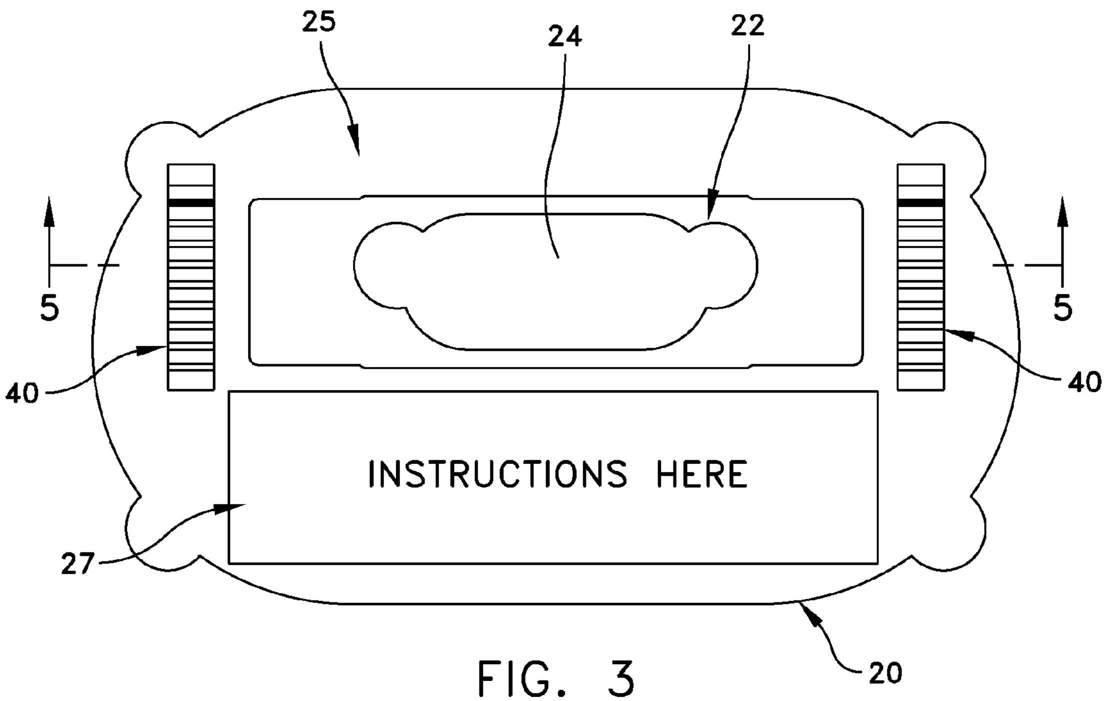
FIG. 3 is a plan view of the device of FIG. 2.
Figure 4:
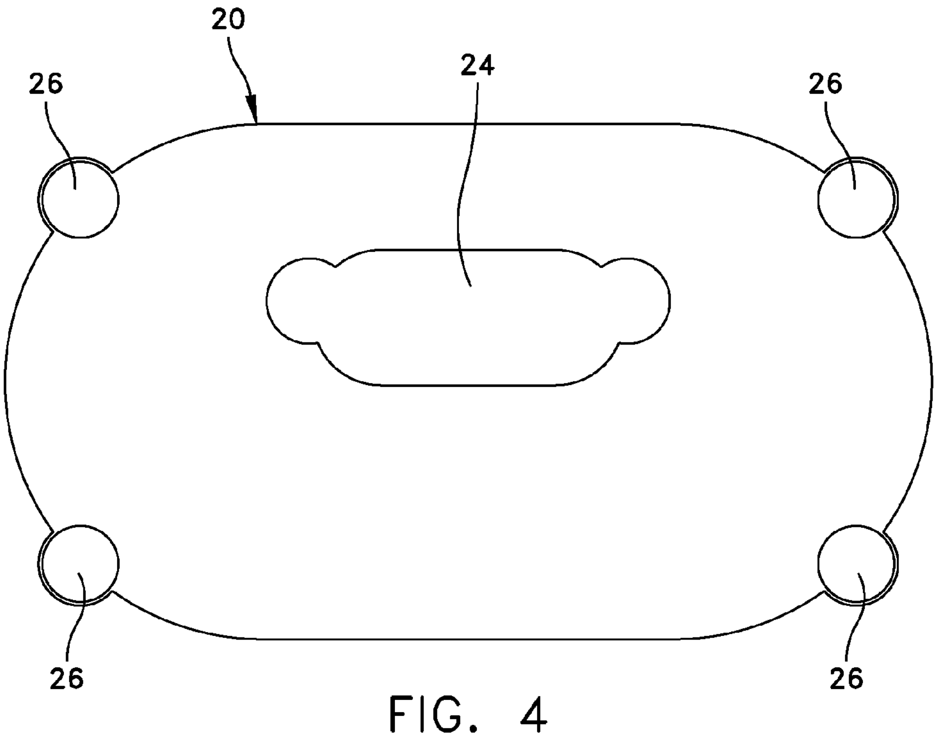
FIG. 4 is a bottom view of the device of FIG. 2.
Figure 5:
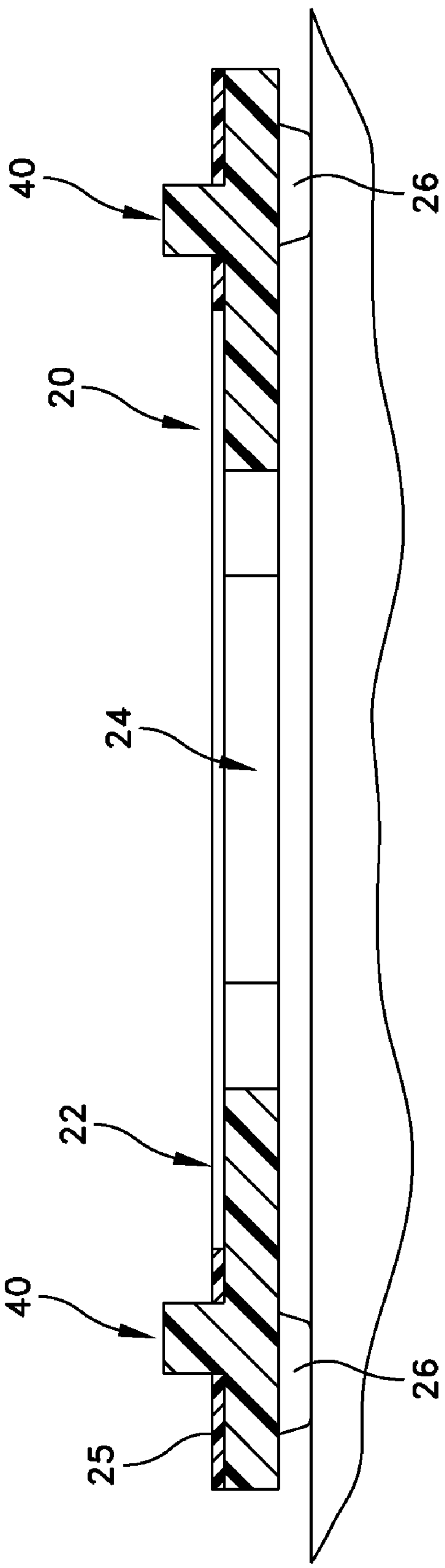
FIG. 5 is a cross-sectional view taken along line 5-5 of FIG. 3.
Figure 6:
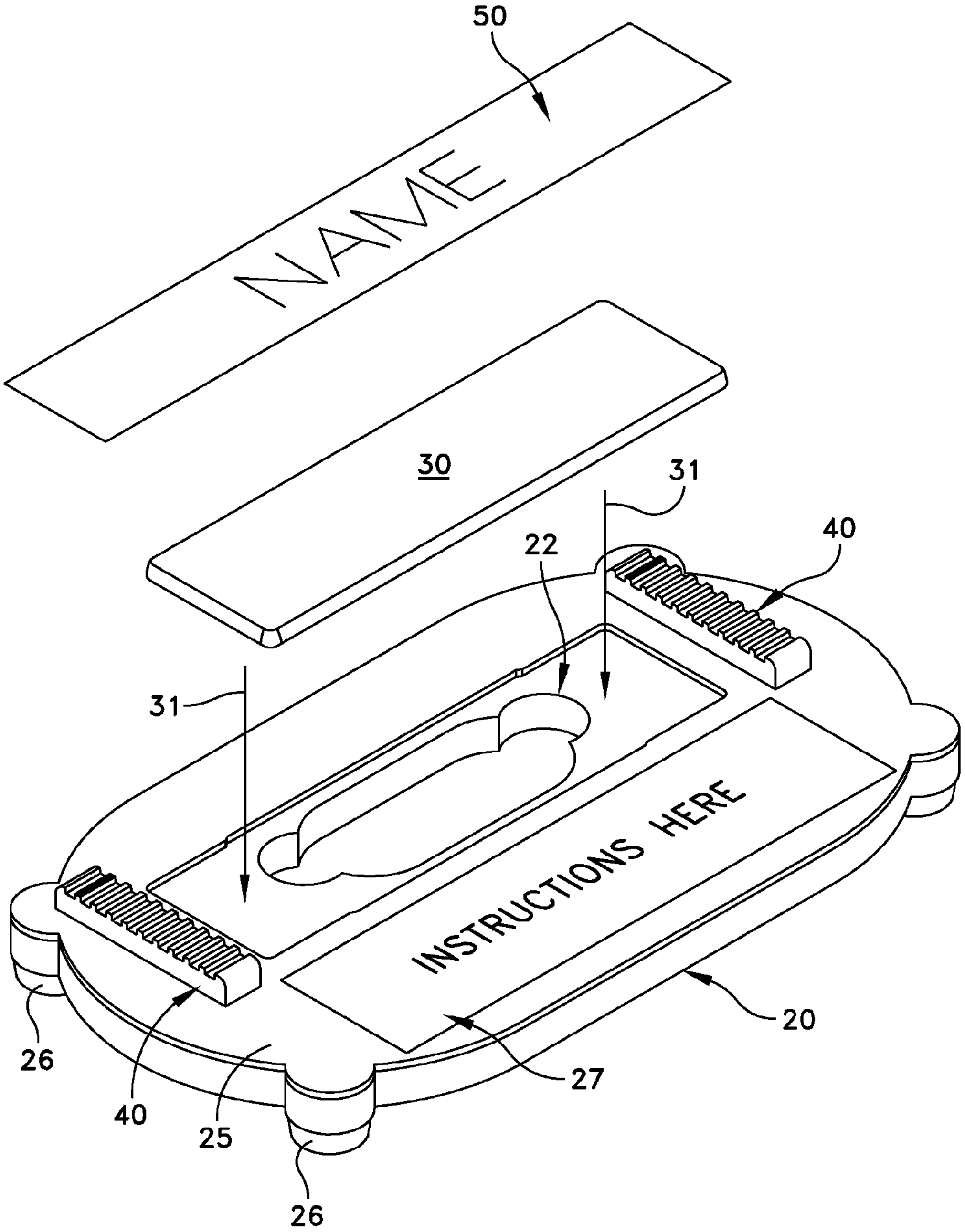
FIG. 6 is an exploded perspective view of the labeling device of the present invention also illustrating the name badge and name tape.
Figure 10:
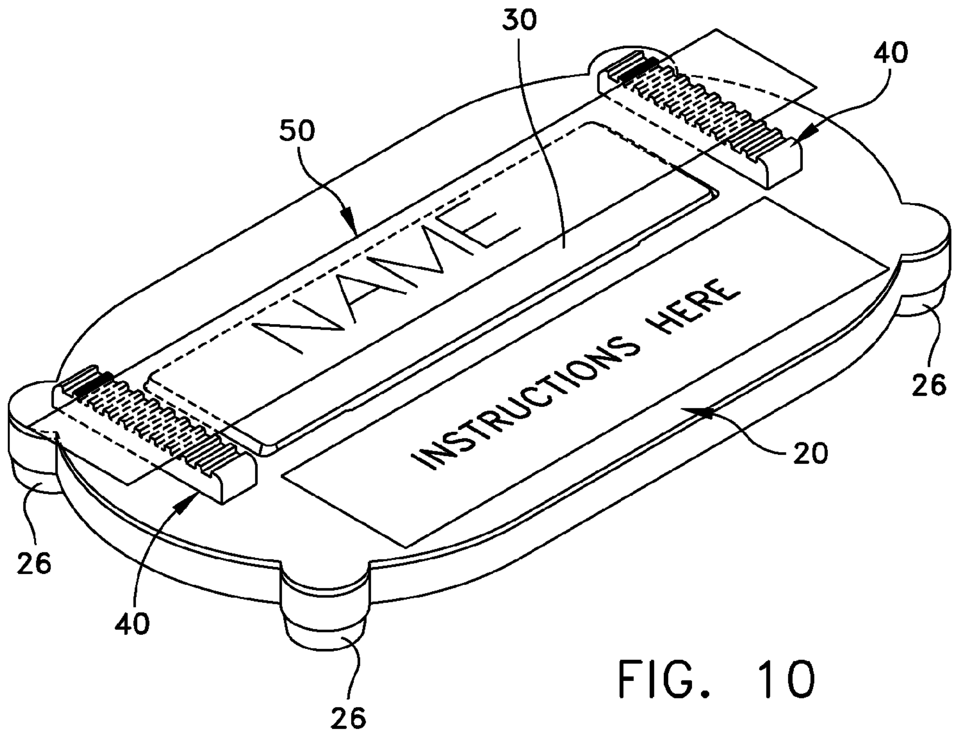
FIG. 10 is a perspective view with the tape positioned over the device.
Figure 11:
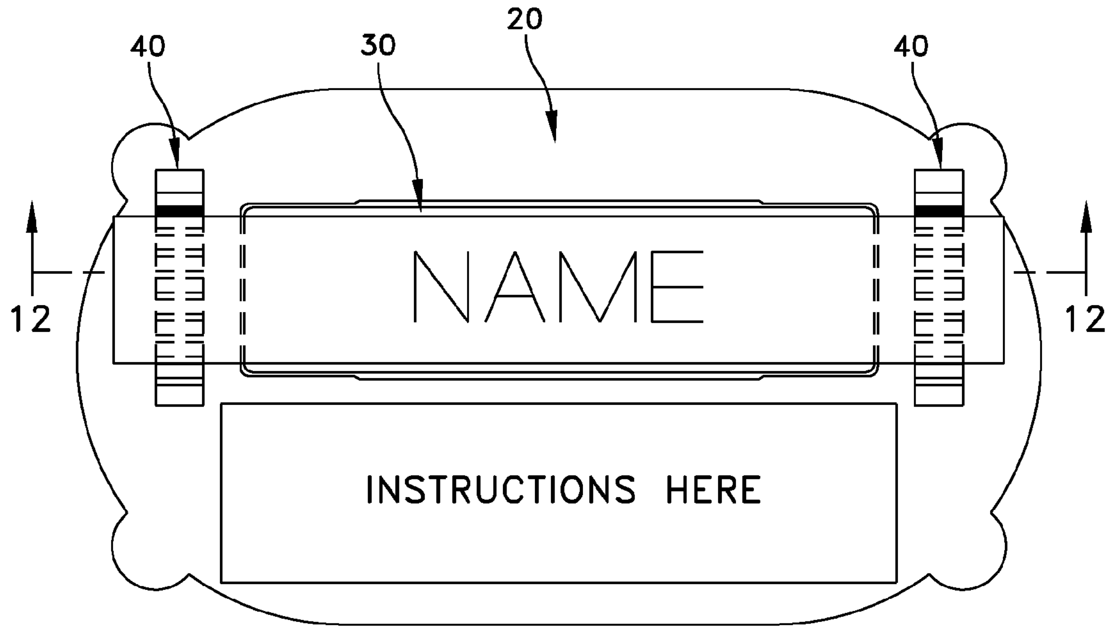
FIG. 11 is a top plan view of the device showing the placement of the label.
Figure 12:
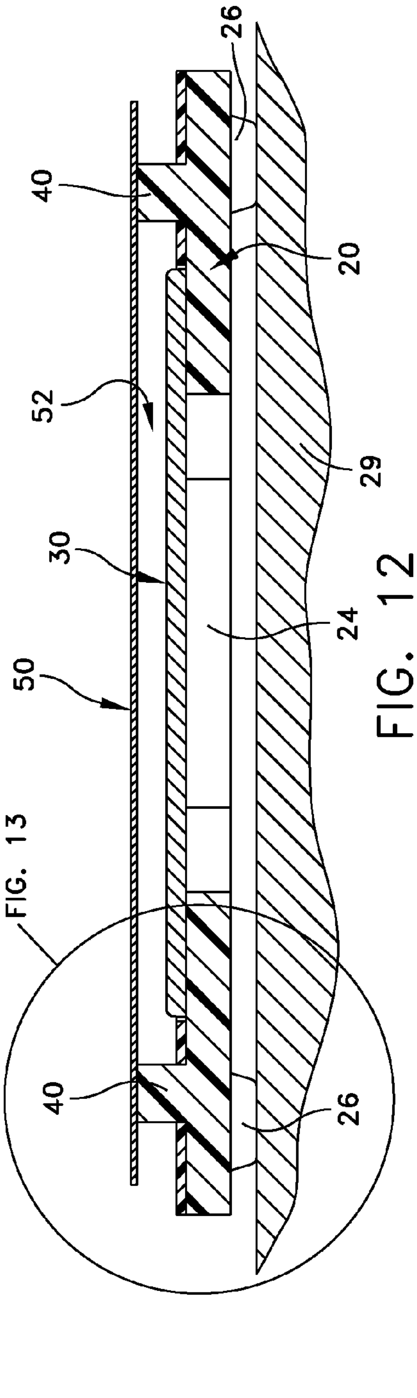
FIG. 12 is a cross-sectional view taken along line 12-12 of FIG. 11.
Figure 14:
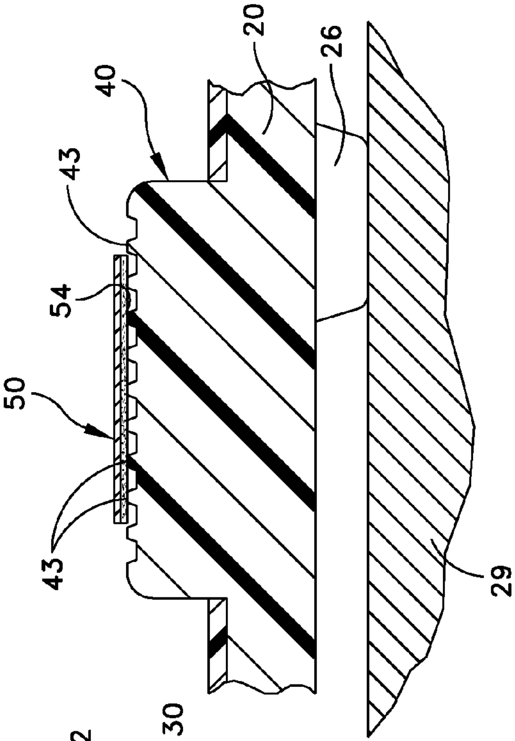
FIG. 14 is a cross-sectional view taken along line 14-14 of FIG. 13.
Figure 13:
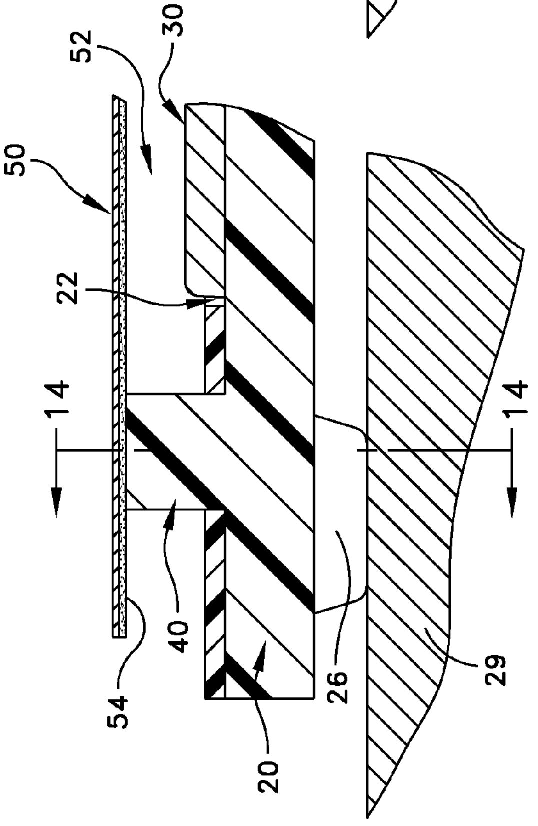
FIG. 13 is a partial cross-sectional view of the cross-section of FIG. 12.

Reference is now made to FIG. 2 which is a perspective view of a preferred embodiment of the device used with the system of the present invention. This includes a base member or fixture 20 that is generally of planar construction and may be formed of a number of different types of material including metal and plastic materials. In one embodiment the fixture is made of clear plastic. The base member 20 has an indentation that forms a seat 22 that is substantially rectangular in shape. The seat 22 is for accommodating the name badge 30 as shown in the exploded perspective view of FIG. 6. The base member 20 may also be provided with a through passage 24. The through passage 24 is used to provide a space for receiving a fastener, or the like that is usually attached to the rear surface of the name badge. Many times pins are used but they are not illustrated in the drawings. As also illustrated in FIGS. 4 and 5, the base member 20 is provided with four legs 26. The seat 22 may be formed by milling out the rectangular section in the base member. Alternatively, and as illustrated, for example, in FIG. 5, the seat 22 may be formed by the application of an additional layer 25 that has a rectangular opening that forms the seat 22. In either case, the seat 22 is dimensioned so as to snugly receive the name badge 30. In this regard refer also to FIG. 6 which illustrates by arrows 31 the placement of the name badge toward the seat 22. FIGS. 9-14 illustrate the name badge 30 in place within the seat 22. FIGS. 12-14 also illustrate in separate cross-sectional views, the placement of the base member 20 on a rest surface 29. These cross-sectional views illustrate the legs 26 placed on the rest surface 29. One of the advantages of forming the seat by an additional layer 25, is that on this layer, such as illustrated in FIG. 3, at area 27 there may be provided a set of instructions for the use of the labeling system.

Extending upwardly from the base member 20 is a pair of spacedly disposed bridge members 40. As illustrated in the cross-sectional views of FIGS. 12-14, these bridge members are integral with the base member 20. Alternatively, the bridge members may be separate members that are secured to the base member. Each of the bridge members 40 has an upper surface that is disposed above the top surface of the layer 25. This is also illustrated in FIGS. 12-14. This is so that the label 50 when placed between the bridge members 40, provides a gap or space so that initially contact is not made from the tape to the name badge. This space is indicated in FIG. 12, for example, at 52.

Each of the bridge members 40 may be considered as a substantially rectangular construction having an elongated axis that is substantially orthogonal to the elongated axis of the seat 22. The upper surface of each of the bridge members is provided with a series of spacedly disposed ribs 43. The ribs 43 extend in a direction orthogonal to the longitudinal axis of each bridge member. In an alternate embodiment, the ribs may extend longitudinally of each bridge member in which case there would be fewer ribs than those illustrated in, for example, FIG. 2. These raised ribs assist in obtaining a proper alignment between the tape and the badge surface while at the same time minimizing adherence between the tape and the ribbed surface. It is essentially only the peaks of the ribs 43 that the tape contacts as illustrated clearly in the cross-sectional view of FIG. 14. This raised rib arrangement will minimize the adherence between the tape and the bridge member so that when a roller is used as described hereinafter, the tape is more easily forced against the badge surface.

Figure 7:
FIG. 7 is a plan view of the label.
Figure 8:
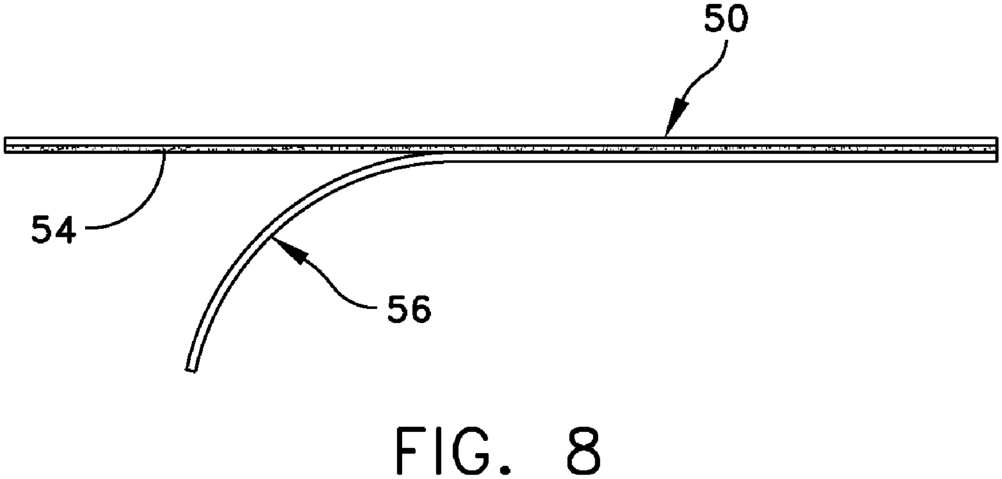
FIG. 8 is a bottom view of the label of FIG. 7 also illustrating the adhesive backing.

Reference is now made to FIGS. 7 and 8 for an illustration of the tape that may be used. This tape is adhesive backed and may be considered as of conventional design. The tape 50 thus includes a tape base 52 and an adhesive layer 54. FIG. 8 illustrates a peel-off strip 56 that may be used and removed from the name tape prior to its being applied over the device fixture.

Figure 9:
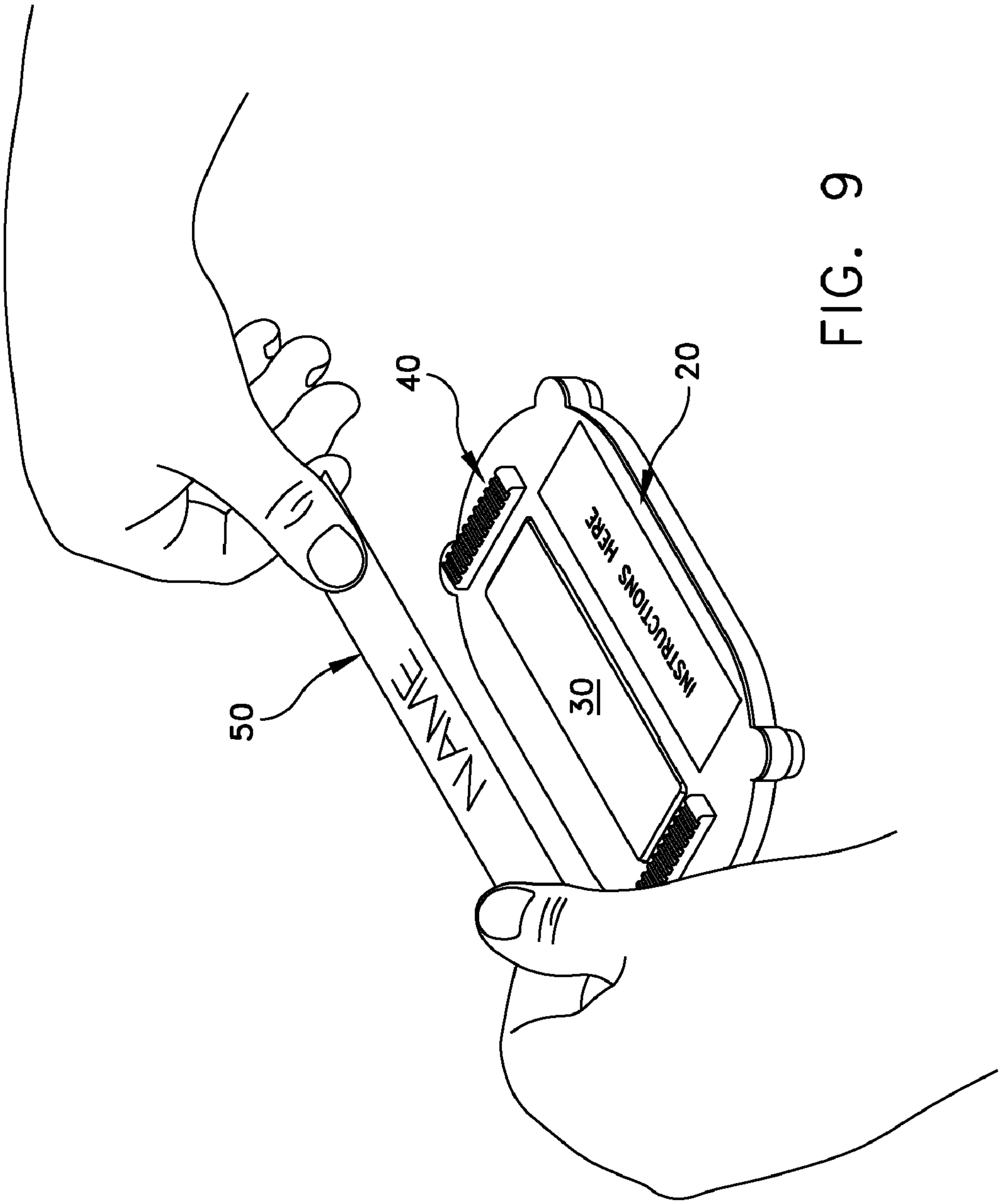
FIG. 9 is a perspective view of the labeling system with the tape being applied.

The sequence of operation of the system includes first placing a clean, dust free name badge blank into the holding seat 22. FIG. 9 illustrates the name badge 30 in position in the seat 22. FIGS. 11 and 12 also illustrate the name badge 30 in place in the seat.

The next step is to hold the printed tape 50 in the position illustrated in FIG. 9. The tape 50 is held taut between the thumb and index finger in the left and right hand so that the tape is bridged between the bridge members 40. FIGS. 10 and 11 illustrate the tape 50 in position over the name badge and extending between the bridge members 40. As clearly illustrated in FIG. 11, the user of the system can readily align the tape 50 directly over the name badge 30. Also, as indicated previously, the tape adheres only at the peaks of the ribs as referenced before in connection with the cross-sectional view of FIG. 14. The cross-sectional views of FIGS. 12 and 13 also illustrate the tape 50 with its adhesive side down and bridging between the members 40 with a gap 52 provided between the tape and name badge.

Figure 15:
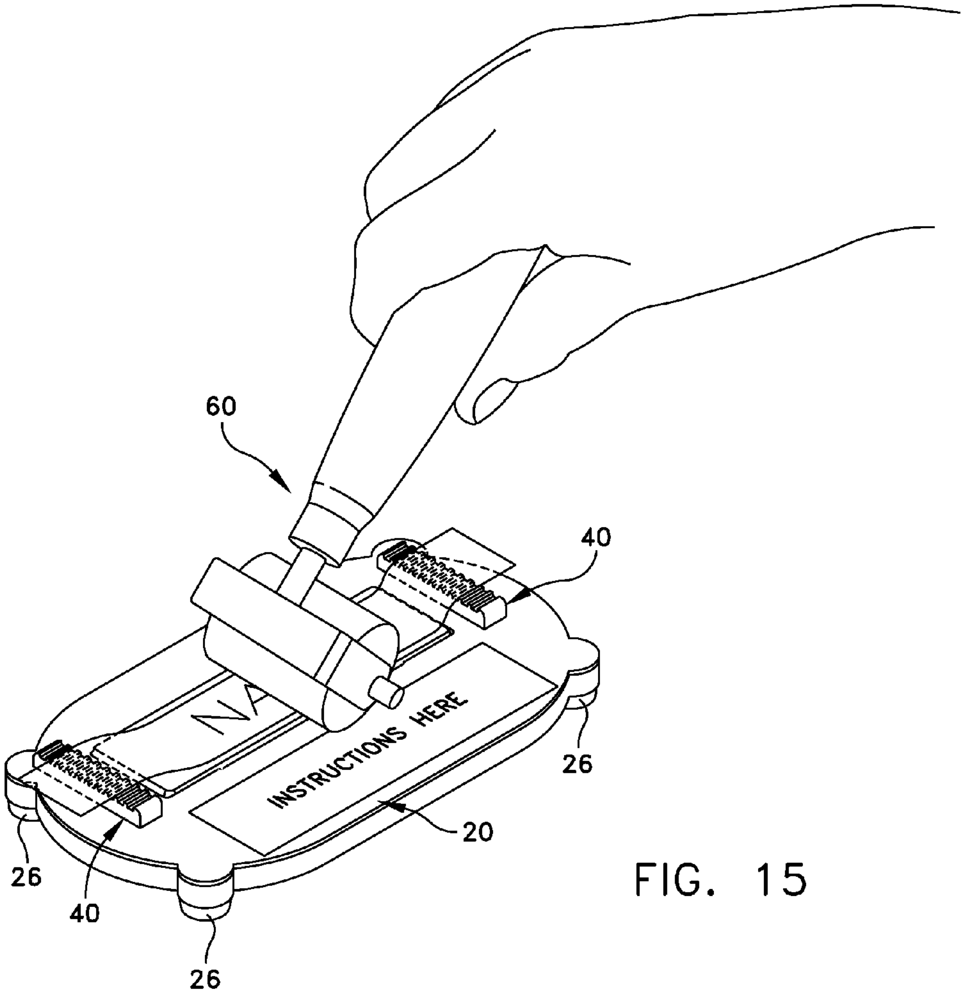
FIG. 15 is a perspective view showing the use of the roller as applying the label.
Figure 16:
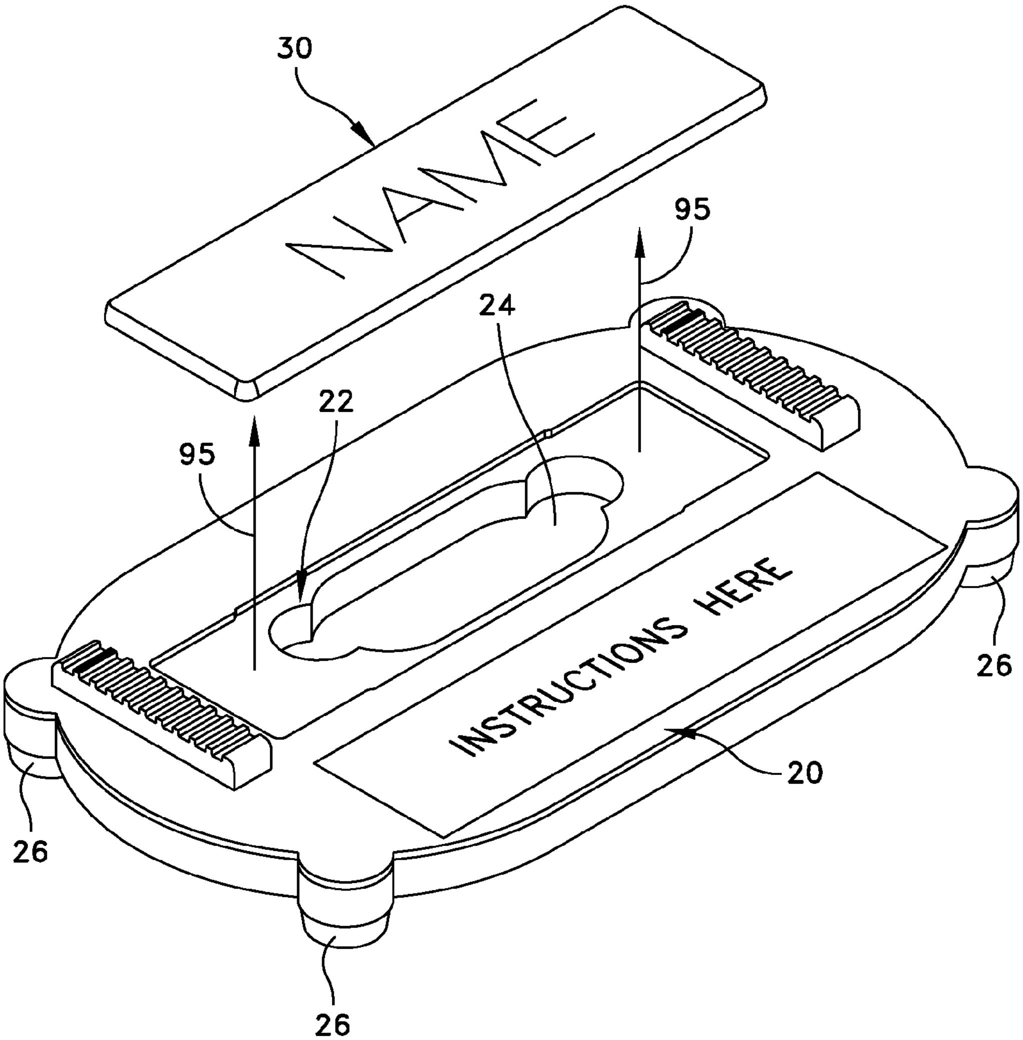
FIG. 16 is a perspective view showing the finished name badge removed from the device.

The next step in the method is to use a soft rubber roller illustrated at 60 in FIG. 15. The roller 60 is moved back and forth over the tape and forces the tape onto the surface of the name badge as shown in FIG. 15. It is preferred to begin at the center and roll out firmly and fully from end to end. It is preferred that this sequence be carried out a number of times. A last step may be to scissor trim the tape ends. FIG. 16 illustrates a removal of the name badge with the tape applied thereto as indicated by the arrows 95.

Having now described a limited number of embodiments of the present invention, numerous other embodiments and modifications thereof are contemplated as falling within the scope of the present invention as defined by the appended claims.

What is claimed is:

1. A labeling system for applying an adhesive backed name tape to a name badge, comprising:

a base member having an elongated seat having a length greater than a width thereof and for receiving the name badge and positioning the name badge at a fixed location on atop surface of the base member;

a pair of spacedly disposed bridge members with each bridge member being supported by said base member outboard respective opposite ends of the seat;

said pair abridge members each having an elongated upper tape support surface that is disposed spaced above the top surface of the base member;

each said bridge member having a length that extends substantially orthogonal to the length of the seat;

said adhesive backed name tape being positionable over the name badge, extending supported between and contacting the upper tape support surface of the respective pair of bridge members and spaced from the name badge;

and a roller for contacting a top surface of the adhesive backed name tape so as to apply the adhesive backed name tape to the name badge.

2. The labeling system of claim 1 wherein the seat is formed by an indentation in a top layer of the base member, and the adhesive backed name tape has an adhesive layer that contacts the bridge members.

3. The labeling system of claim 2 wherein the seat is of the same size as the name badge.

4. The labeling system of claim 1 wherein the base member has legs for the support thereof.

5. The labeling system of claim 1 wherein each bridge member has a length that is greater than the width of the seat.

6. The labeling system of claim 1 wherein each bridge member has a top surface formed with a plurality of spaced ribs.

7. The labeling system of claim 6 wherein the ribs each provide a series of contact lines with the adhesive backed name tape and extending substantially parallel to the length of the seat.

8. A labeling system for applying an adhesive backed name tape to a name badge, comprising:

a base member having an elongated seat having a length greater than a width thereof and for receiving the name badge and positioning the name badge at a fixed location on a top surface of the base member;

a pair of spacedly disposed bridge members with each bridge member fixedly supported by said base member adjacent, but spaced from respective opposite ends of the seat;

said pair of bridge members each having an elongated upper tape support surface that is disposed spaced above the top surface of the base member;

each said bridge member having a length that extends substantially orthogonal to the length of the seat;

said adhesive backed name tape being positionable over the name badge, extending supported between and contacting the upper tape support surface of the respective pair of bridge members and spaced from the name badge;

wherein the adhesive backed name tape is urged against the name badge so as to apply the adhesive backed name tape to the name badge.

9. The labeling system of claim 8 wherein the seat is formed by an indentation in a top layer of the base member, and the adhesive backed name tape has an adhesive layer that contacts the bridge members.

10. The labeling system of claim 9 wherein the seat is of the same size as the name badge.

11. The labeling system of claim 8 wherein the base member has legs for the support thereof.

12. The labeling system of claim 8 wherein each bridge member has a length that is greater than the width of the seat.

13. The labeling system of claim 8 wherein each bridge member has a top surface formed with a plurality of spaced ribs.

14. The labeling system of claim 13 wherein the ribs each provide a contact line with the adhesive backed name tape and extend substantially orthogonal to the length of the seat.

15. The labeling system of claim 1 wherein the name badge has a longitudinal axis with a length greater than its width, each bridge member has a longitudinal axis with a length greater than its width, and the longitudinal axis of the bridge members both extend transverse to the longitudinal axis of the name badge and are spaced apart a distance greater than the length of the name badge.

16. The labeling system of claim 15 wherein the length of each bridge member is greater than the width of the name badge.

17. The labeling system of claim 15 wherein the bridge members support the name tape so that there is a uniform spacing between the name tape and the name badge along the entire length of the name tape between the bridge members.

18. The labeling system of claim 17 wherein the upper tape support surface of both bridge members extends in a plane that is substantially in parallel with the plane of the supported name badge.

19. The labeling system of claim 18 wherein the upper support surface of both bridge members has a plurality of closely and parallel spaced elongated ribs that extend transverse to the length of the bridge member.

20. The labeling system of claim 8 wherein the name badge has a longitudinal axis with a length greater than its width, each bridge member has a longitudinal axis with a length greater than its width, and the longitudinal axis of the bridge members both extend transverse to the longitudinal axis of the name badge and are spaced apart a distance greater than the length of the name badge.

21. The labeling system of claim 20 wherein the length of each bridge member is greater than the width of the name badge.

22. The labeling system of claim 20 wherein the bridge members support the name tape so that there is a uniform spacing between the name tape and the name badge along the entire length of the name tape between the bridge members.

23. The labeling system of claim 22 wherein the upper tape support surface of both bridge members extends in a plane that is substantially in parallel with the plane of the supported name badge.

24. The labeling system of claim 23 wherein the upper support surface of both bridge members has a plurality of closely and parallel spaced elongated ribs that extend transverse to the length of the bridge member.

* * * * *